United States Patent [19]
Kawamoto

[11] Patent Number: 5,928,453
[45] Date of Patent: Jul. 27, 1999

[54] JOINING PROCESS OF RESIN MEMBERS

[75] Inventor: Shigeru Kawamoto, Ootsu, Japan

[73] Assignee: Mitsubishi Jidosha Kogyo Kabushiki Kaisha, Tokyo, Japan

[21] Appl. No.: 08/850,219

[22] Filed: May 1, 1997

[30]      Foreign Application Priority Data

May 14, 1996   [JP]   Japan ..................................... 8-118915

[51] Int. Cl.⁶ ................................................. B29C 65/14
[52] U.S. Cl. .................................. 156/275.1; 156/272.2; 156/293; 156/304.5; 156/309.9
[58] Field of Search ................................ 156/272.2, 293, 156/304.5, 309.9, 158, 275.1; 264/248, 264

[56]            References Cited
            U.S. PATENT DOCUMENTS 3,276,941   10/1966   Burns .
3,635,280   1/1972    Parsons .
4,107,768   8/1978    Lemkin .
4,514,242   4/1985    MacLaughlin et al. .
4,869,766   9/1989    Pate et al. .
5,338,611   8/1994    Lause et al. .
5,470,679   11/1995   Lund et al. .
5,670,109   9/1997    De Rees ............................... 156/304.5

*Primary Examiner*—Sam Chuan Yao

[57]            ABSTRACT

Two resin members are provided, at surfaces to be joined, with side surfaces, respectively. The side surfaces and the side surfaces are substantially parallel with respect to an opposing direction of the resin members. After the side surfaces are heated and fused by infrared heaters movably arranged in the vicinity of the respective side surfaces, the side surfaces are joined together under pressure.

17 Claims, 8 Drawing Sheets

SEC X-X

JOINING PROCESS OF RESIN MEMBERS

BACKGROUND OF THE INVENTION

Field of the Invention

As methods for joining two resin members together, ultrasonic vibration welding and heat welding can be primarily used. According to ultrasonic vibration welding, surfaces of two resin members, where the resin members are to be joined, are formed into such shapes as inducing concentration of stress. While maintaining the resin members in contact with each other under pressure, the resin members are vibrated by an ultrasonic wave from an ultrasonic wave generator so that frictional heat is generated at the surfaces to be joined. The surfaces to be joined are hence fused and joined together.

Known examples of heat welding, on the other hand, include heat welding, eddy-current electromagnetic induction welding and direct heat welding. In heat welding, mutually-opposing surfaces to be joined are entirely heated and fused and are then brought into contact with each other under pressure so that they are joined together. According to eddy-current electromagnetic induction welding, a resinous bonding piece added with electrically-conductive powder such as iron powder is arranged between surfaces to be joined, a high-frequency current is caused to flow through a coil arranged in a vicinity of the surfaces to be joined, and the electrically-conductive powder is heated by an eddy current generated through the coil so that the resinous bonding piece is fused to join the surfaces together. According to direct heating welding, a heating element is arranged between surfaces to be joined, the surfaces to be joined are fused by the heating element so that the surfaces are joined together including the heating element [see Japanese Patent Application Laid-Open (Kokai) No. SHO 62-267125].

However, ultrasonic vibration welding and eddy-current electromagnetic induction welding generally require expensive equipment and hence result in high production cost. Since surfaces to be joined are fused by frictional heat generated by vibrations in ultrasonic vibration welding, this method does not have much tolerance as to the configurations of surfaces to be joined, and its application is often limited to planar surfaces. Such planar surface configurations however have difficulty in assuring sufficient joint strength in a direction perpendicular to the joined surfaces (in other words, in a pulling direction, namely, in a direction that the joined surfaces separate from each other), that is, in a direction which is generally considered to be most important, although sufficient joint strength is available in a direction parallel to the joined surfaces because the parallel direction is a shearing direction of the joined surfaces. The term "surfaces to be joined" as used herein means surfaces of mutually-opposing two resin members, which are located at opposing positions and are used to join the two resin members together. The same surfaces may hereinafter also be called "joining surfaces" before joining and "joined surfaces" after joining.

Eddy-current electromagnetic induction welding and direct heat welding cannot avoid inclusion of a substance other than a resin material, such as iron powder or a heating element, between joined surfaces. Upon recycling the resin material, advance removal of the additive substance contained in the resin material, such as the heating element, is indispensable. This is certainly not favorable for recyclability. On the other hand, when surfaces to be joined are fused with a heating element kept in contact with the surfaces as in direct heating welding, fusion takes place centering around areas of contact with the heating element so that the fusion may not be achieved to sufficient extent where the surfaces to be joined are wide. Any attempt to arrange more heating elements with a view to overcoming this inconvenience, will however lead to a further deterioration in recyclability. Under the ever-increasing concern about environmental problems and resource reutilization in recent years, the recyclability of resin materials is an extremely important theme.

SUMMARY OF THE INVENTION

With the foregoing theme in view, the present invention has as primary objects thereof the provision of a resin joining process and a joint structure, which feature significantly-improved joint strength at joined surfaces and moreover, excellent recyclability.

In a joint resin structure according to the present invention, two resin members are joined together at mutually-opposing surfaces. Each of these opposing surfaces is provided with a side surface which is substantially in parallel with each other in a mutually-opposing direction of the two resin members. The side surface of one of the resin members and the corresponding side surface of the other resin member have been joined together after they were heated and fused. The joined surfaces may be provided with mutually-opposing surfaces which are substantially perpendicular to the mutually-opposing direction of the resin members, and these mutually-opposing surfaces are maintained in contact with each other in a non-welded state. Each side surface may be provided with an oblique surface which is inclined relative to the mutually-opposing direction of the resin members.

A process of the present invention for joining such mutually-opposing two resin members comprises providing each of the resin members, at a portion to be joined, with a side surface, which is substantially in parallel with the mutually-opposing direction of the resin members, heating and fusing at least one of the side surfaces and then bonding under pressure the side surface of one of the resin members with the corresponding side surface of the other resin member to join the two resin members together. When the individual side surfaces are provided with oblique surfaces inclined relative to the mutually-opposing direction of the resin members, at least one of the side surfaces including the oblique surfaces is heated and fused and is then bonded under pressure to the corresponding side surface to join the resin members together.

According to the present invention, the side surfaces, which are substantially parallel to the mutually-opposing direction of the resin members and may include the oblique surfaces are provided, at least one of the side surfaces is heated and fused and then bonded to the corresponding side surface under pressure. The resin members are therefore prevented from moving in a direction parallel to the side surfaces and also in a direction intersecting the side surfaces, whereby the joint structure is provided with increased tensile strength and shear strength and hence, with improved joint strength.

When it is desired to provide greater joint strength, the surfaces to be joined may be provided with a concave portion and a convex portion, respectively, which are fittedly engageable with each other. At least one of inner side surface of the concave portion and outer side surface of the convex portion is heated and melted and then bonded to the corresponding side surface under pressure. A width or the diameter of the concave portion may be set smaller than that of the convex portion. As an alternative, the outer side surface of the convex portion may be formed into oblique surface so that the width or the diameter of the convex portion becomes smaller towards a free end thereof, or the inner side surface of the concave portion may be formed into oblique surface so that the width or the diameter of the concave portion becomes smaller towards an inner end thereof.

According to the above construction, the inner side surface of the concave portion and the outer side surface of the convex portion, which are formed at the joining surfaces of the two members, respectively, and are fittedly engageable with each other are provided, at least one of the side surfaces is heated and fused and then bonded to the corresponding side surface under pressure. Owing to the mutual fitted engagement of the convex and concave portions subsequent to the heated fusion, the corresponding side surfaces are maintained under compression so that sufficient joint strength can be surely retained.

Further, the width or the diameter of the concave portion may be set smaller than that of the convex portion, or the width or the diameter of the concave portion may be set smaller at the inner end thereof and substantially equal on a side of an opening thereof compared with the width or the diameter of the convex portion. This construction makes it possible to accommodate therein an extra portion of the fused resin material. The extra portion of the fused resin material is therefore prevented from flowing over so that the joint structure can be formed in a desired state.

Moreover, a longitudinal dimension of the concave portion may be set greater than a longitudinal dimension of the convex portion to leave a space between the convex portion and the concave portion. This construction also makes it possible to accommodate therein an extra portion of the fused resin material so that the joint structure can be formed in a desired state.

The outer side surface of the convex portion and/or the inner side surface of the concave portion may be formed into oblique surfaces so that the width or the diameter of the convex portion and/or that of the concave portion become smaller toward an outer end of the convex portion and/or an inner end of the concave portion, respectively. This construction can provide a strong joint between the convex portion and the concave portion while permitting smooth joining of both the portions.

The surfaces to be joined may be provided with mutually-opposing surfaces which are substantially perpendicular to the opposing direction of the resin members. When these mutually-opposing surfaces of the resin members are brought into contact with each other in a unfused state and the corresponding side surfaces are bonded together in a fused state under pressure, the resin members are fusion-bonded at the side surfaces thereof with the positional accuracy of the joined surfaces being maintained by the mutually-opposing surfaces. The stably-joined surfaces can therefore be assured.

An infrared heater may be movably arranged in a vicinity of at least one of the side surfaces of at least one of the resin members to heat and fuse the side surface. This makes it possible to join the two resin members without causing an infrared heater as a heating member to be left between the joined surfaces. In addition, this feature can bring about a still further advantage that upon recycling, removal of an additive substance is no longer needed, leading to better recyclability.

Further, a heat barrier may be arranged between the infrared heater and the opposing surface to shield the opposing surface from heat. Therefore the opposing surface is protected from heat and is allowed to remain in the non-fused state. This makes it possible to assure the positional accuracy of the surfaces during joining and to maintain the thus-joined state of the surfaces stable.

According to the present invention, at least one of the two resin members is heated and fusion-bonded to the other at the side surfaces thereof which are substantially parallel to the mutually-opposing direction of the two resin members. When external forces are applied in opposite direction away from the resin members, the above-described external forces act as shear forces on both the side surfaces bonded together under pressure so that greater joint strength is exhibited.

In addition, the surfaces to be joined together may include opposing surfaces which are substantially perpendicular to the mutually-opposing direction of the resin members and are brought into contact with each other without being heated and fusion-bonded. These opposing surfaces serve as reference surfaces upon joining so that the accuracy of joining is assured.

DETAILED DESCRIPTION OF THE INVENTION AND PREFERRED EMBODIMENTS

Figure 1:
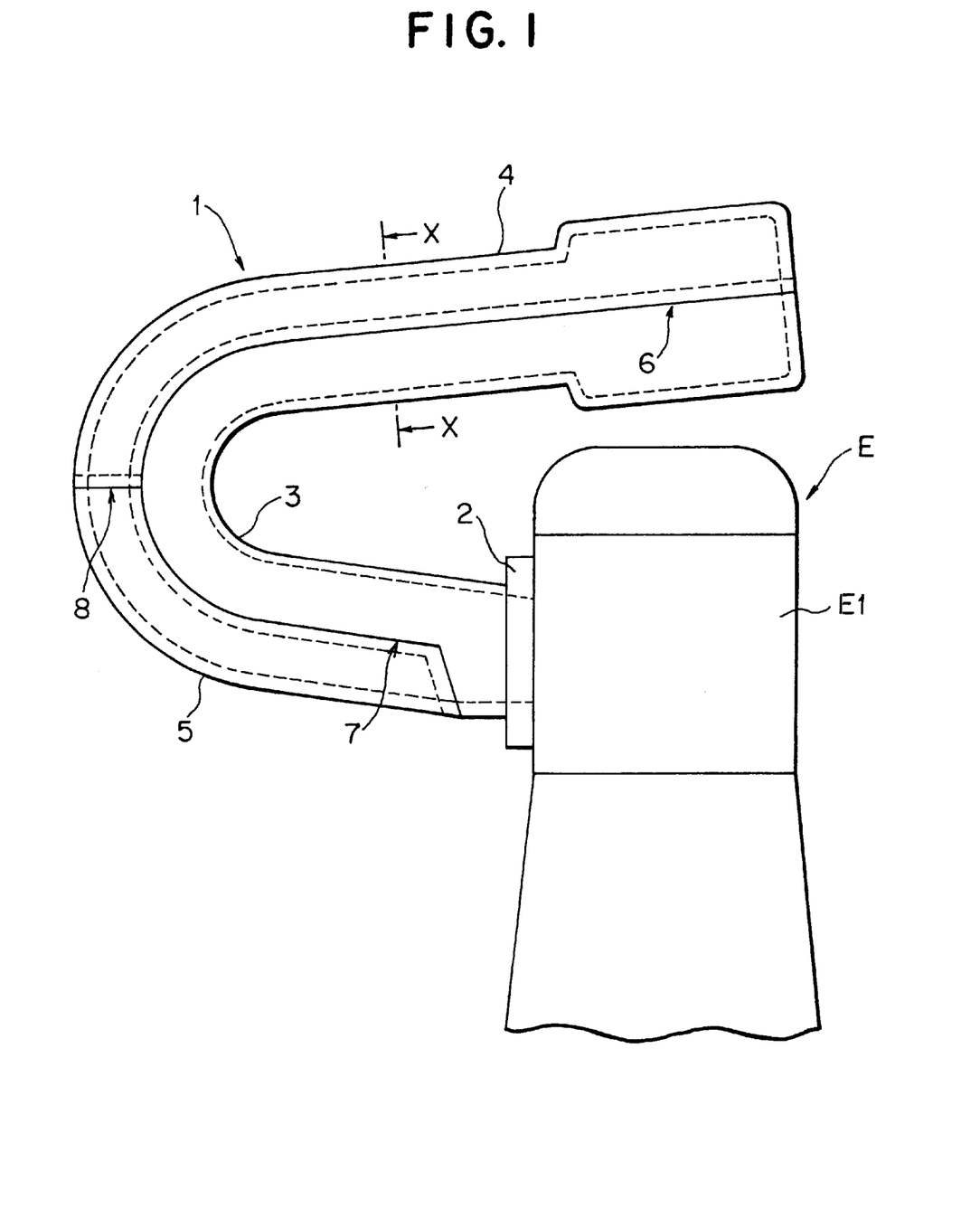
FIG. 1 is a side view showing the construction of an intake manifold to which the present invention has been applied.

The joining process of resin members and joint structure according to the present invention will hereinafter be described specifically taking as an example a resin-made intake manifold 1 shown in FIG. 1. The intake manifold 1 is formed of a known material, for example, a polyamide having thermoplastic properties. Examples of other suitable materials include resins such as acrylic resins and polypropylene resins.

The intake manifold 1 is composed of three members which in the side view, consists of an inner member (second resin member) 3 with a coupling flange 2 formed thereon, and a first outer member (first resin member) and a second outer member 5, both joined to the inner member 3 from an outer direction. The intake manifold 1 is fastened on a cylinder block E1 of an engine E by unillustrated bolts. Although the description will be continued centering around the structure of a joint between the inner member 3 and the second outer member 5, the present invention can of course be applied to the joint structure of a joint structure 7 between the inner member 3 and the second outer member 5 and also to the joint structure of a joint 8 between the first outer member 4 and the second outer member 5.

Figure 2:
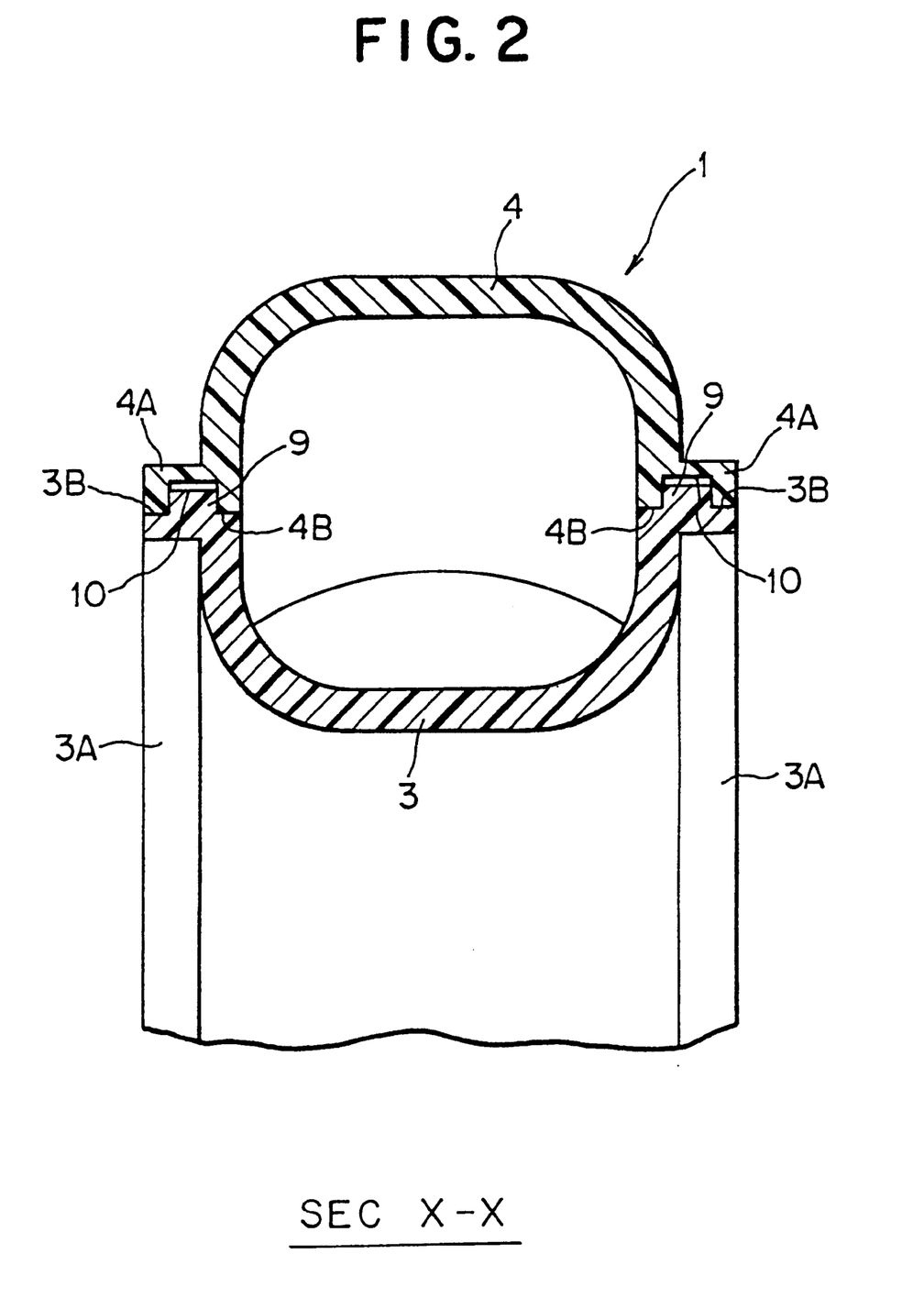
FIG. 2 is a cross-sectional view taken in the direction of arrows II—II of FIG. 1.

The structure of the joint 6 between the inner member 3 and the first outer member 4 is shown in more detail in FIG. 2. Flange portions 3A,3A are formed on transversely opposite sides of the inner member 3, and flange portions 4A,4A are formed on transversely opposite sides of the first outer member 4. Each of the flange portions 3A,3A and the flange portions 4A,4A include joined surface 3B and joined surface 4B, which are facing each other. The joined surfaces 3B,3B are provided with convex portions 9,9 which are formed integrally with the joined surfaces 3B,3B and extend toward the corresponding joined surfaces 4B,4B. The opposing joined surfaces 4B,4B are provided with concave portions 10,10 in which the convex portions 9,9 have been fitted subsequent to fusion. Incidentally, FIGS. 3 through 8 show the joined surfaces 3A,4A on only one side. With reference to these drawings, the description of the embodiments of the present invention will be continued.

Figure 3:
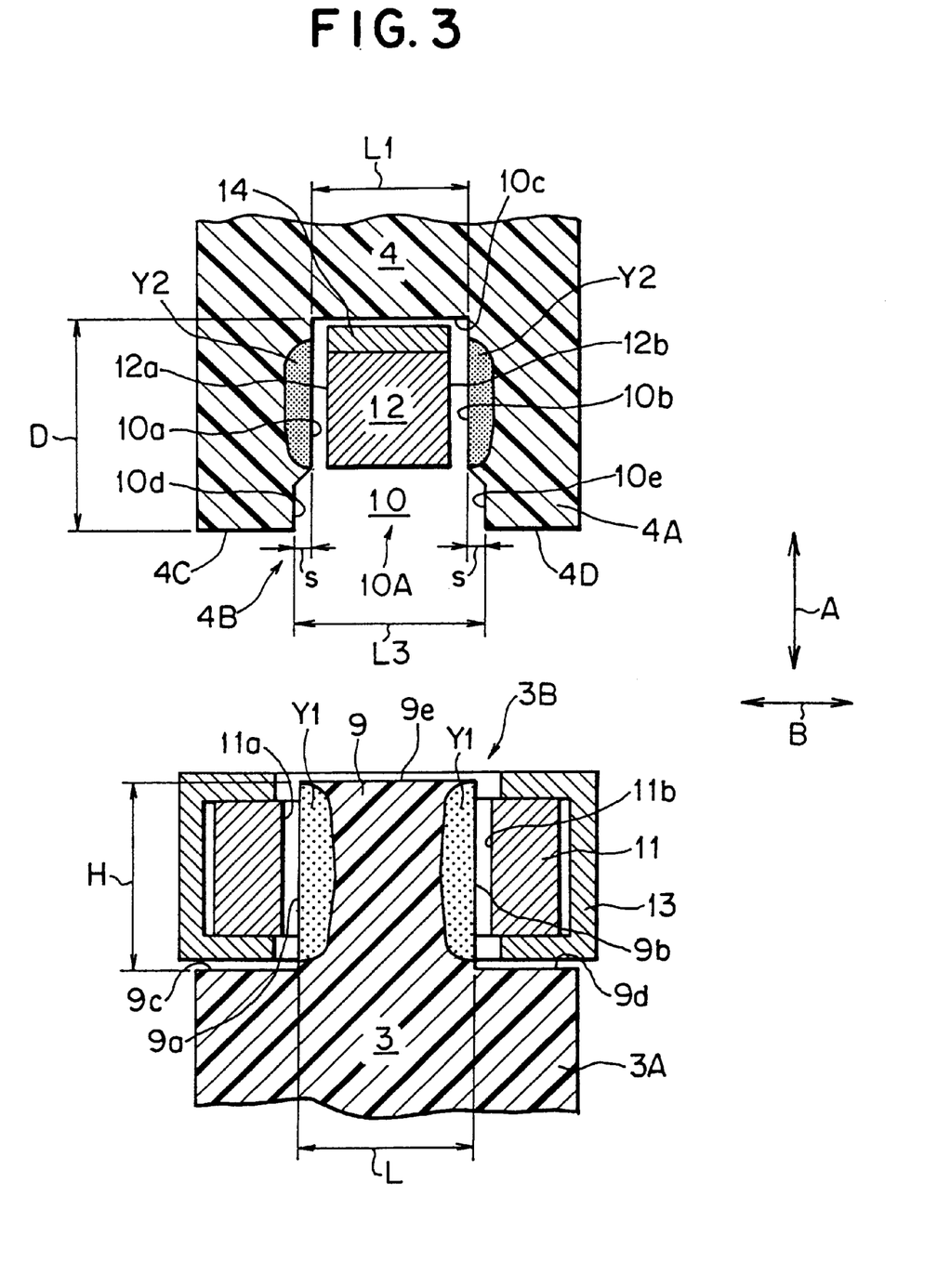
FIG. 3 is a cross-sectional view illustrating a joint structure and joining process according to a first embodiment of the present invention.

As is illustrated in FIG. 3, the convex portion 9 is formed substantially centrally of the surface 3B to be joined (hereinafter called "the joining surface 3B), and is provided with outer side surfaces 9a,9b which are formed substantially in parallel with a direction of an arrow A in which the inner member 3 and the first outer member 4 are opposing to each other. End surfaces (second reference surfaces) 9c,9d of the convex portion 9 are formed as planar surfaces which extend at substantially right angles relative to the outer side surfaces 9a,9b, respectively.

The concave portion is provided with inner side surfaces (first side surfaces) 10a,10b formed substantially in parallel with the corresponding outer side surfaces (second side surfaces) 9a,9b and also with an inner end surface (first opposing surface) 10c formed as a surface extending at substantially right angles relative to the inner side surfaces 10a,10b. A distance L1 between the inner side surfaces 10a,10b and a distance L between the outer side surfaces 9a,9b are set to satisfy a relationship of L1<L. A longitudinal dimension D of the concave portion 10 and a longitudinal dimension H of the convex portion 9 are set to meet a relationship of H<D so that, when the convex portion 9 is fitted in the concave portion 10, an extra space T is formed between an outer end surface (second opposing surface) 9e of the convex portion 9 and the inner end surface 10c of the concave portion 10 (see FIG. 4).

The convex portion 9 and the concave portion 10 are formed continuously along the surface 3B and the surface 4B, respectively, in this embodiment. They may, however, be formed interruptedly. For example, cross-sections of the convex portion 9 an the concave portion 10 may have circular shapes.

Further, inner side surfaces (first side surfaces) 10d,10e which are located on a side of an opening 10A of the concave portion 10 are formed in such a way that they are located sideways by a width s relative to their corresponding inner side surfaces 10a,10b. A distance L3 between the inner side surfaces 10d,10e is set substantially equal to the distance L between the outer side surfaces 9a,9b. As a consequence, overlaps as great as the width s are formed between the side surfaces 9a,9b and the side surfaces 10a,10b, respectively. The width s may preferably range, for example, from 0.1 mm to 0.3 mm or so, although it varies depending on the depth to (amount in) which the concave portion 9 and the convex portion 10 are desired to be fused by infrared heaters to be described subsequently herein.

In the vicinity of the outer side surfaces 9a,9b and the inner side surfaces 10a,10b, infrared heaters 11,12 are movably arranged as heating means. The infrared heater 11 is arranged opposite the outer side surfaces 9a,9b, and is provided with heat barriers 13 which are interposed between the infrared heater 11 and the end surfaces 9c,9d to insulate heat from the infrared heater 11. In the illustrated embodiment, the infrared heater 11 is covered by a heat insulator, which is formed in a turned square U-section, except for opposing surfaces 11a,11b of the infrared heater 11, said surfaces being located opposite the outer side surfaces 9a,9b.

The infrared heater 12 is arranged opposite the inner side surfaces 10a,10b, and is provided with a heat barrier 14 between the infrared heater 12 and the inner end surface 10c to insulate heat from the infrared heater 12. In the illustrated embodiment, a heat insulator is applied to an inner surface 12c of the infrared heater 12, the inner surface 12c being located opposite the inner end surface 10c. The infrared heaters 11,12 are connected to an unillustrated high-voltage power supply and can heat the outer side surfaces 9a,9b and the inner side surfaces 10a,10b to a softening point of the resin to fuse them in a short time. Slow heating involves a potential problem that the entire joining surfaces 3B,4B may be thermally distorted. It is therefore sufficient to perform the heating of the outer side surfaces 9a,9b and the inner side surfaces 10a,10b by the corresponding heaters 11,12 until fused depths Y1,Y2 reach at least the overlapped dimension. It is desired to conduct this heating at a high temperature in a short time.

Near the inner member 3 and the first outer member 4 in an unjoined form, a clamping jig (not shown) is arranged to hold both members and to bring the first outer member into contact with the inner member 3 under pressure, so that both members are brought into contact with each other under pressure immediately after completion of the heating by the infrared heaters 11,12.

Figure 4:
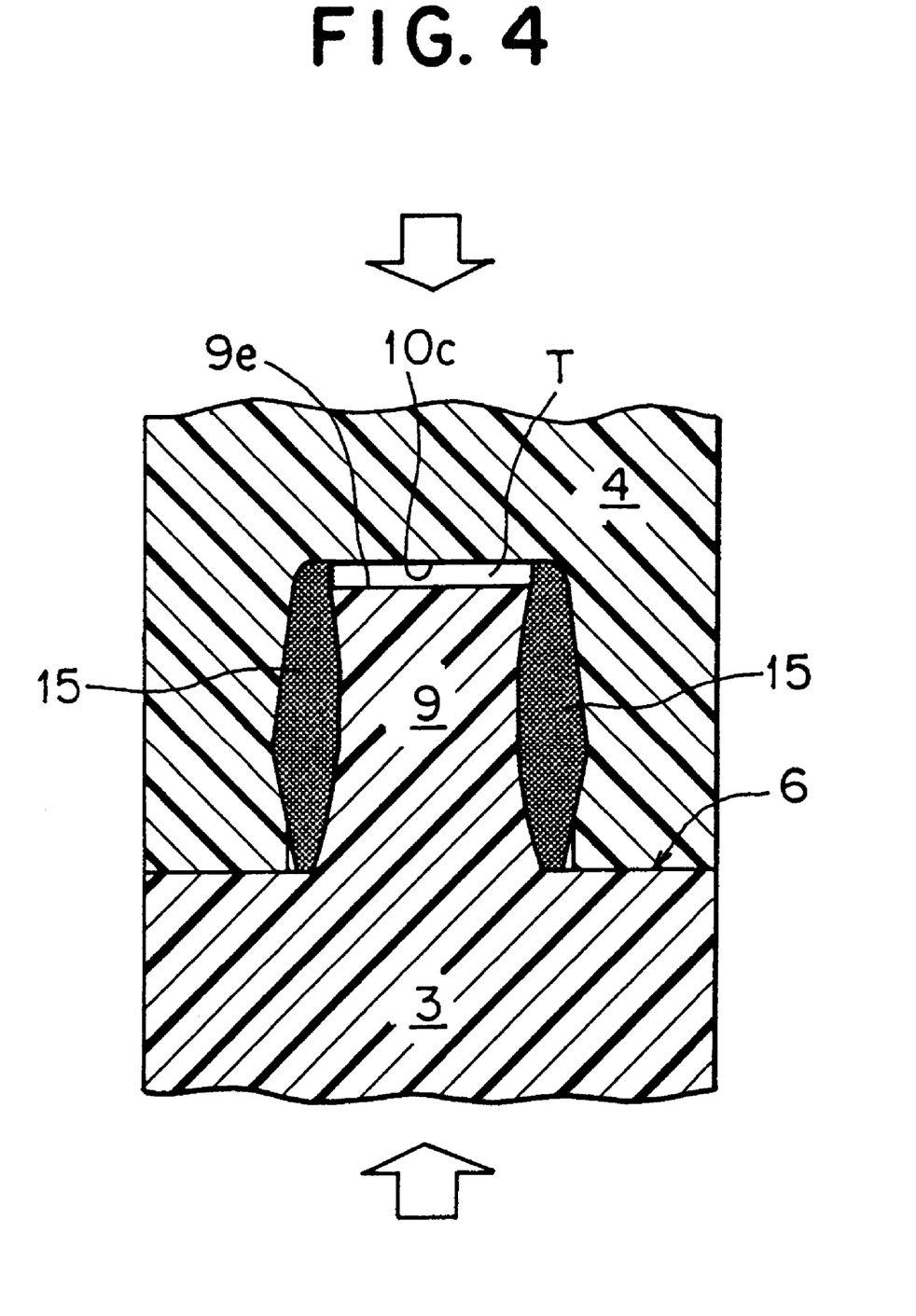
FIG. 4 is a cross-sectional view of a joined state of two resin members in the first embodiment.

Because a resin generally has low thermal conductivity, heat treatment of the outer side surfaces 9a,9b and the inner side surfaces 10a,10b at a high temperature in a short time causes the outer side surfaces 9a,9b and the inner side surfaces 10a,10b to fuse only at their surfaces so that central parts can retain their base configurations. When the inner member 3 and the first outer member 4 are brought into contact under pressure immediately after the heating and fusion, the fused convex portion 9 and fused concave portion 10 are fitted together so that they are mutually fusion-bonded over the fused depths Y1,Y2. Designated at numeral 15,15 in FIG. 4 are fusion-bonded portions. Extra fused resin may be formed depending on the extent of the mutually-fused depths Y1,Y2 and overlaps s. Such extra fused resin can be confined within the concave portion 10 owing to the provision of the extra space T.

Overflow of such extra fused resin onto the end surfaces 9c,9d and end surfaces (first reference surface) 4C,4D, which are located opposite the end surfaces 9c,9d, is therefore minimized, so that the joint 6 can be maintained under good conditions. Since the joint 6 is formed by the fused fitting between the concave portion 10 and the convex portion 9, the joint 6 exhibits higher strength in the opposing direction indicated by an arrow A in FIG. 3 and also in the shear direction of surfaces 4C,4D and 9c,9d extending at a right angle relative to the opposing direction and indicated by an arrow B in the same drawing.

In addition, heat is not transmitted so much from the infrared heaters 11,12 to the end surfaces 9c,9d and the end surfaces 4C,4D that these end surfaces remain unfused. Upon joining both members 3,4 together, these end surfaces can therefore serve as reference surfaces, whereby the joining positions of the members 3,4 as viewed in the direction of the arrow A are stabilized. Namely, the joining between the inner member 3 and the first outer member 4 is effected between the side surfaces 9a,9b and their corresponding side surfaces 10a,10b and the positional accuracy of the joining during the joining work is assured by the end surfaces 9c,9d,4C,4D which remain unfused.

According to the process employed in this embodiment, the joint 6 can be formed through fusion without frictionally fusing the joining surfaces of both members 3,4 under vibrations. Neither a bonding piece, which contains metal powder, nor heating wires as heating means in contact with the joining surfaces as in the conventional joining methods are required. Therefore, the process of this embodiment can minimize the limitation to the configurations of the surfaces to be joined and can also avoid the inclusion of a substance other than the resin material of the inner member 3 and the first outer member 4 in the joint 6.

The avoidance of the inclusion of an additive substance in the joint 6 can obviate removal work of metal powder, which is contained in a bonding piece, or heating wires upon shredding or re-melting the intake manifold 1 for recycling subsequent to its recovery, leading to better recyclability.

Figure 5:
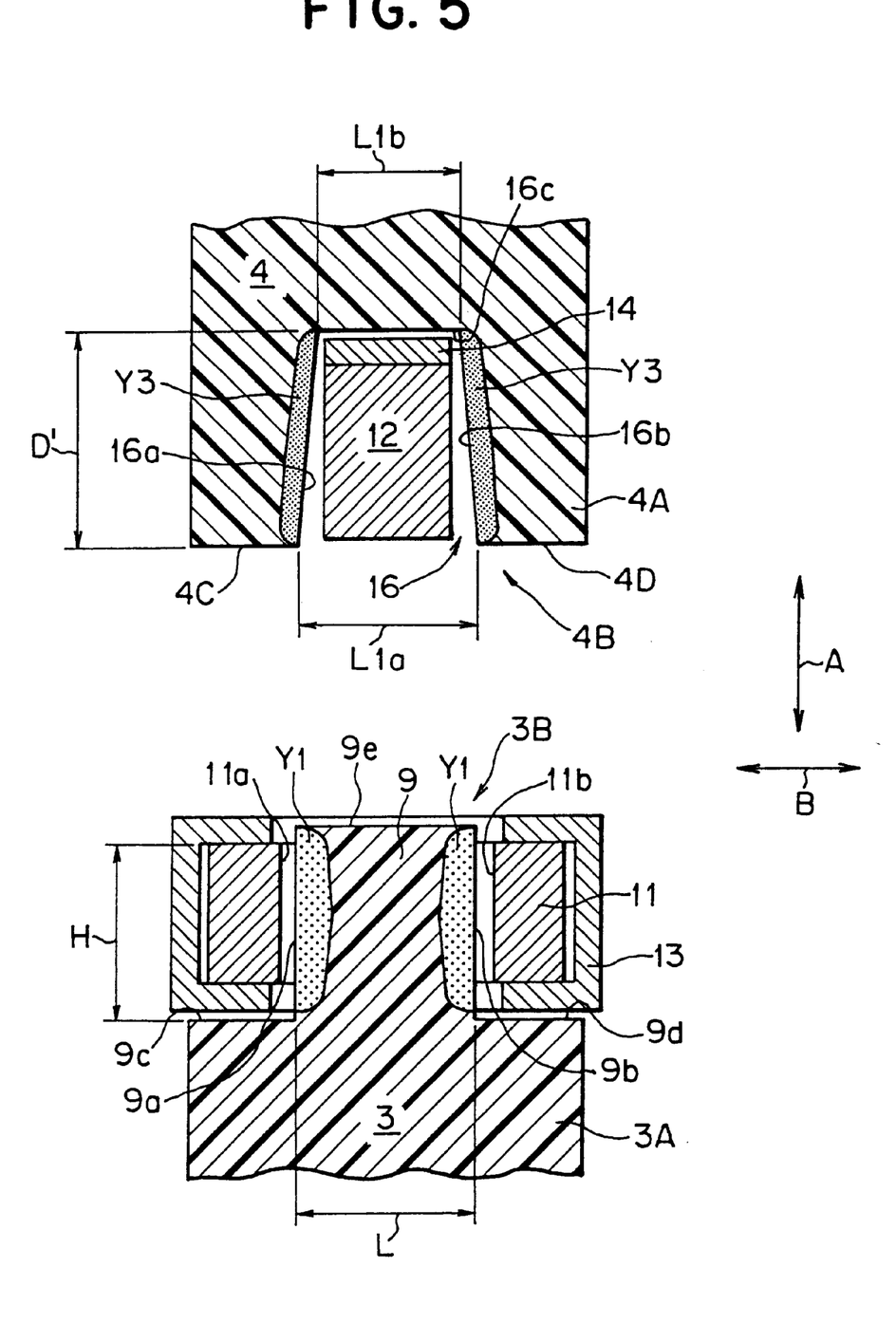
FIG. 5 is a cross-sectional view illustrating a joint structure and joining process according to a second embodiment of the present invention.
Figure 6:
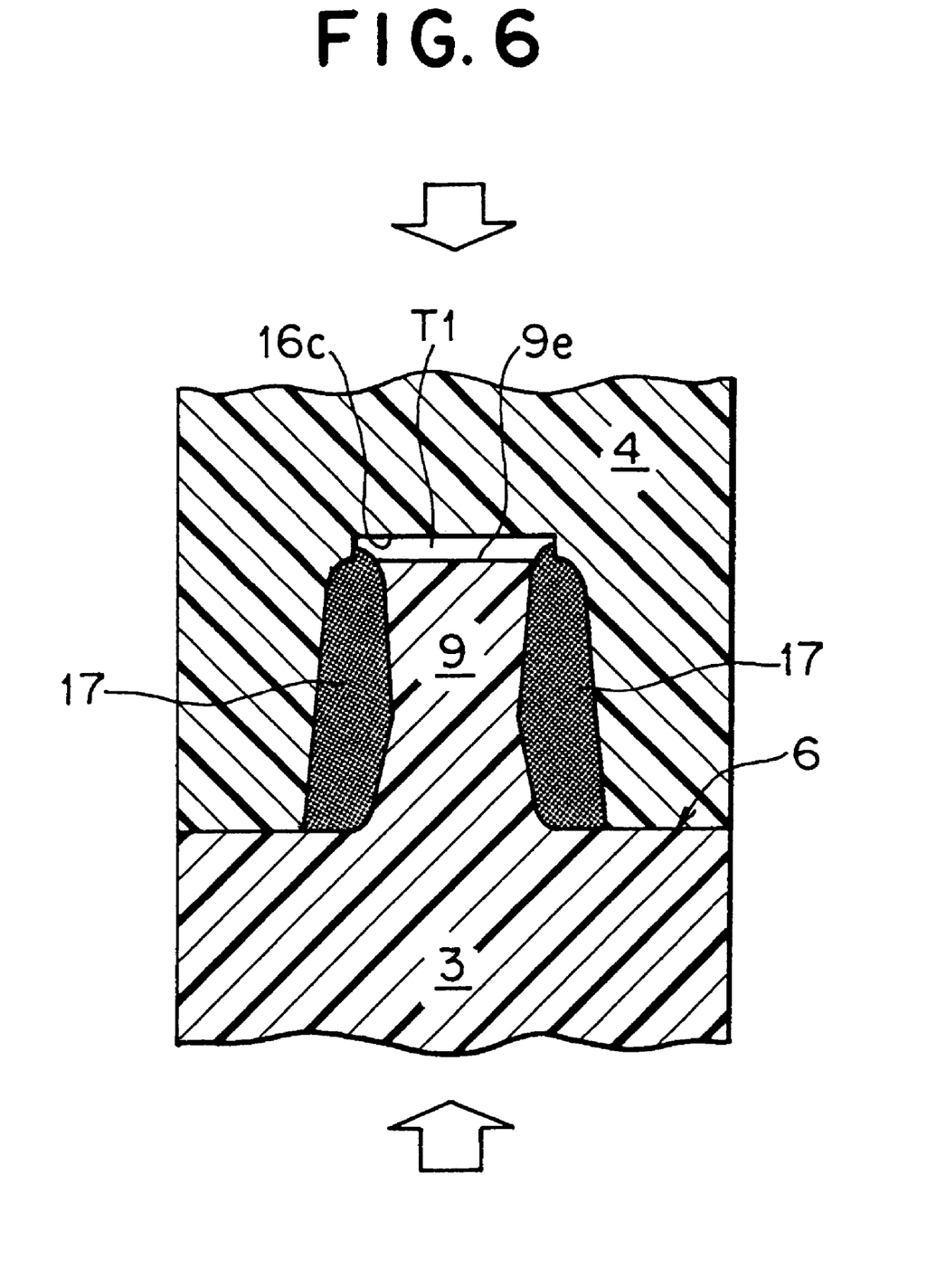
FIG. 6 is a cross-sectional view of a joined state of two resin members in the second embodiment.

A description will next be made of the second embodiment. The second embodiment shown in FIGS. 5 and 6 is of the same construction as the first embodiment with respect to an inner member 3, but is different from the first embodiment in the configuration of a concave portion 16 formed in a first outer member 4. Accordingly, elements of the same constructions as the corresponding elements in the first embodiment are designated by the same reference signs and their detailed description is omitted herein.

In the concave portion 16 in the second embodiment, a distance L1a between inner side surfaces (first side surface) 16a,16b on a side of an opening is set substantially equal to the distance L between the outer side surfaces of the convex portion 9, while a distance L1b on a side of an inner end surface (first opposing surface) 16c is set smaller than the distance L between the outer side surfaces of the convex portion 9. The inner side surfaces 16a,16b are therefore formed as oblique surfaces so that the distance between the inner side surfaces 16a,16b becomes gradually smaller toward the inner end surface 16c.

A longitudinal dimension D' of the concave portion 16 is set greater than the longitudinal dimension H of the convex portion 9, so that like the first embodiment, an extra space T1 (see FIG. 6) is formed between the inner end face 16c and the outer end surface 9e of the convex portion 9 to allow extra fused resin to flow thereinto. An infrared heater 12 is arranged in the vicinity of the inner side surfaces 16a,16b so that these inner side surfaces can be heated and fused to a fused depth Y3. In this embodiment, a heat barrier 14 is also arranged between the infrared heater 12 and the inner end surface 16c to maintain the inner end surface 16c as an unfused surface. The fused depth Y3 overlaps the fused depth Y1 of each of the outer side surfaces 9a,9b.

When the first outer member 4, which has the concave portion 16, and the inner member 3 are heated for a short time by the infrared heaters 12,11, respectively, the outer side surfaces 9a,9b and the inner side surfaces 16a,16b are fused only at their surfaces so that central parts can retain their base configurations. When the inner member 3 and the first outer member 4 are brought into contact under pressure immediately after the heating and fusion, the fused convex portion 9 and concave portion 10 are fitted together so that they are mutually fusion-bonded over the fused depths Y1,Y3. Designated at numeral 17 in FIG. 6 are fusion-bonded portions. Extra fused resin may be formed depending on the extent of the mutually-fused depths Y1,Y3. Such extra fused resin can be confined within the concave portion 16 owing to the provision of the extra space T1.

Overflow of such extra fused resin onto the end surfaces 9c,9d and the end surfaces 4C,4D, which are located opposite the end surfaces 9c,9d, is therefore minimized, so that the joint 6 can be maintained under good conditions. Since the joint 6 is formed by the fused fitting between the concave portion 16 and the convex portion 9, the joint 6 exhibits higher strength in an opposing direction indicated by an arrow A in FIG. 5 and also in a shear direction of surfaces 4C,4D and 9c,9d indicated by an arrow B in the same drawing figure.

In addition, heat is not transmitted so much from the infrared heaters 11,12 to the end surfaces 9c,9d and the end surfaces 4C,4D that these end surfaces remain unfused. Upon joining both members 3,4 together, these end surfaces can therefore serve as reference surfaces, whereby the joining positions of the members 3,4 as viewed in the direction of the arrow A are stabilized. Namely, the joining between the inner member 3 and the first outer member 4 is effected between the side surfaces 9a,9b and their corresponding side surfaces 16a,16b and the positional accuracy of the joining during the joining work is assured by the end surfaces 9c,9d,4C,4D which remain unfused.

The joint 6 is also formed through fusion in the second embodiment without frictionally fusing the joining surfaces 3B,4B under vibrations. Neither a bonding piece, which contains metal powder, nor heating wires as heating means in contact with the joining surfaces 3B,4B as in the conventional joining methods are required. Therefore, the process of this embodiment can minimize the limitation to the configurations of the surfaces to be joined and can also avoid the inclusion of a substance other than the resin material of the inner member 3 and the first outer member 4 in the joint 6.

The avoidance of the inclusion of an additive substance in the joint 6 can obviate removal work of metal powder, which is contained in a bonding piece, or heating wires upon shredding or re-melting the intake manifold 1 for recycling subsequent to its recovery, leading to better recyclability. In this embodiment, the inner side surfaces 16a,16b as the side surfaces of the concave portion 16 are arranged as oblique surfaces, respectively. It is of course possible to form the outer side surfaces 9a,9b of the convex portion as oblique surfaces while maintaining constant the distance between the inner side surfaces 16a,16b of the concave portion 16 or to form both the inner side surfaces 16a,16b and the outer side surfaces 9a,9b as oblique surfaces.

A description will next be made of the third embodiment. According to the third embodiment shown in FIGS. 7 and 8, the inner member 3 and the first outer member 4 are provided at joining surfaces 3B,4B thereof with side surfaces 18,19, respectively. The side surfaces 18,19 are substantially parallel to the opposing direction of the inner member 3 and the first outer member 4 indicated by the arrow A. The respective side surfaces 18,19 are heated and fused by infrared heaters 20,21 and are then joined together.

Figure 7:
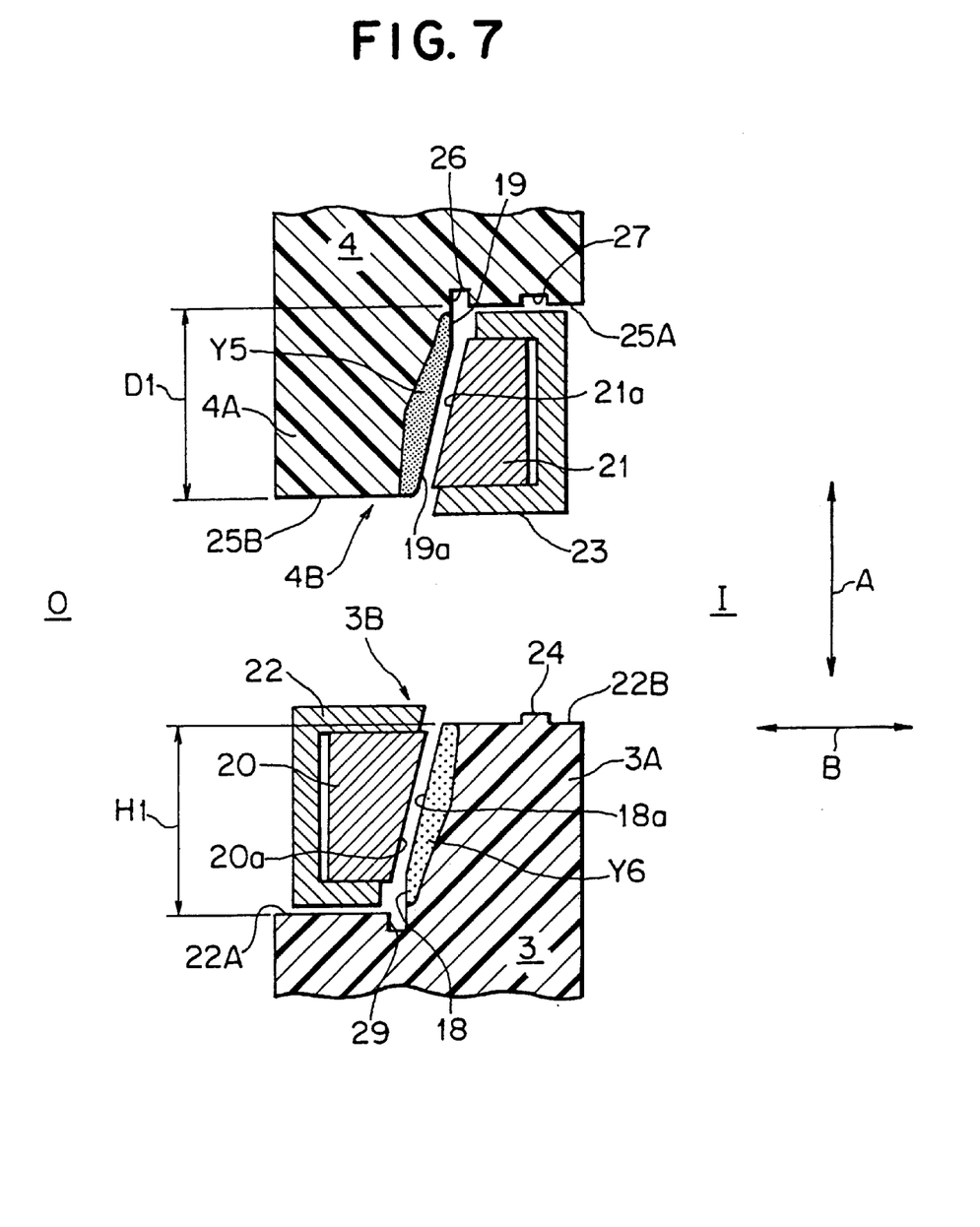
FIG. 7 is a cross-sectional view illustrating a joint structure and joining process according to a third embodiment of the present invention.

The joining surface 3B is formed on a stepped portion which has been arranged by cutting the flange portion 3A of the inner member 3 from an outer side O toward an inner side I. A side surface (second side surface) 18 is formed from an intermediate portion thereof into an oblique surface (second oblique surface) 18*a* inclined toward the inner side I. Between the side surface 18 and a bottom end surface (second reference surface) 22A of the joining surface 3B, a recess 29 is formed so that extra fused resin can be received therein. On a top end surface (second opposing surface) 22B of the joining surface 3B, a guide ridge 24 is formed extending toward the first outer member 4.

The joining surface 4B is formed on a stepped portion which has been arranged by cutting the flange portion 4A of the first outer member 4 from the inner side I toward the outer side O. A side surface (first side surface) 19 is formed from an intermediate portion thereof into an oblique surface (first oblique surface) 19*a* inclined toward the outer side O. Upon joining, the oblique surface 19*a* and the oblique surface 18*a* are brought into a contiguous relationship. Between the side surface 19 and a bottom end surface 25A of the joining surface 4B, a recess 26 is formed so that extra fused resin can be received therein. In a bottom end surface 25A of the joining surface 4B, a groove 27 is formed. Upon joining the inner member 3 and the first outer member 4 together, this groove 27 engages the guide ridge 24 so that it functions to position the joining surfaces 3B,4B and also to prevent the joint 6 from being displaced in a shear direction indicated by an arrow B. It is preferred to form these ridges 24 and grooves 27 at the same time as the corresponding flange portions 3A,4A are formed.

The ridge 24 and the groove 27 are formed continuously along the surface 22B and the surface 25A, respectively, in this embodiment. They may, however, be formed interruptedly. For examples, the ridge 24 and the groove 27 may have circular shapes when viewed in direction A.

The infrared heaters 20,21 are movably arranged opposite the side surfaces 18*a*,19*a*, respectively. Designated at numerals 22,23 are heat barriers which insulate the bottom end surfaces 22A,25A from heat from the heaters 20,21. In the illustrated embodiment, the infrared heaters 20,21 are covered by heat insulators of a turned square U-section except for opposing surfaces 20*a*,21*a* which are located opposite the side surfaces 18*a*,19*a*, respectively. The opposing surfaces 20*a*,21*a* are formed substantially in parallel with the side surfaces 18*a*,19*a*, respectively.

Near the inner member 3 and the first outer member 4 in an unjoined form, a clamping jig (not shown) is arranged to hold both members and to bring them into contact with each other under pressure. After completion of the heating step by the infrared heaters 20,21, both members are immediately brought into contact with each other under pressure.

Figure 8:
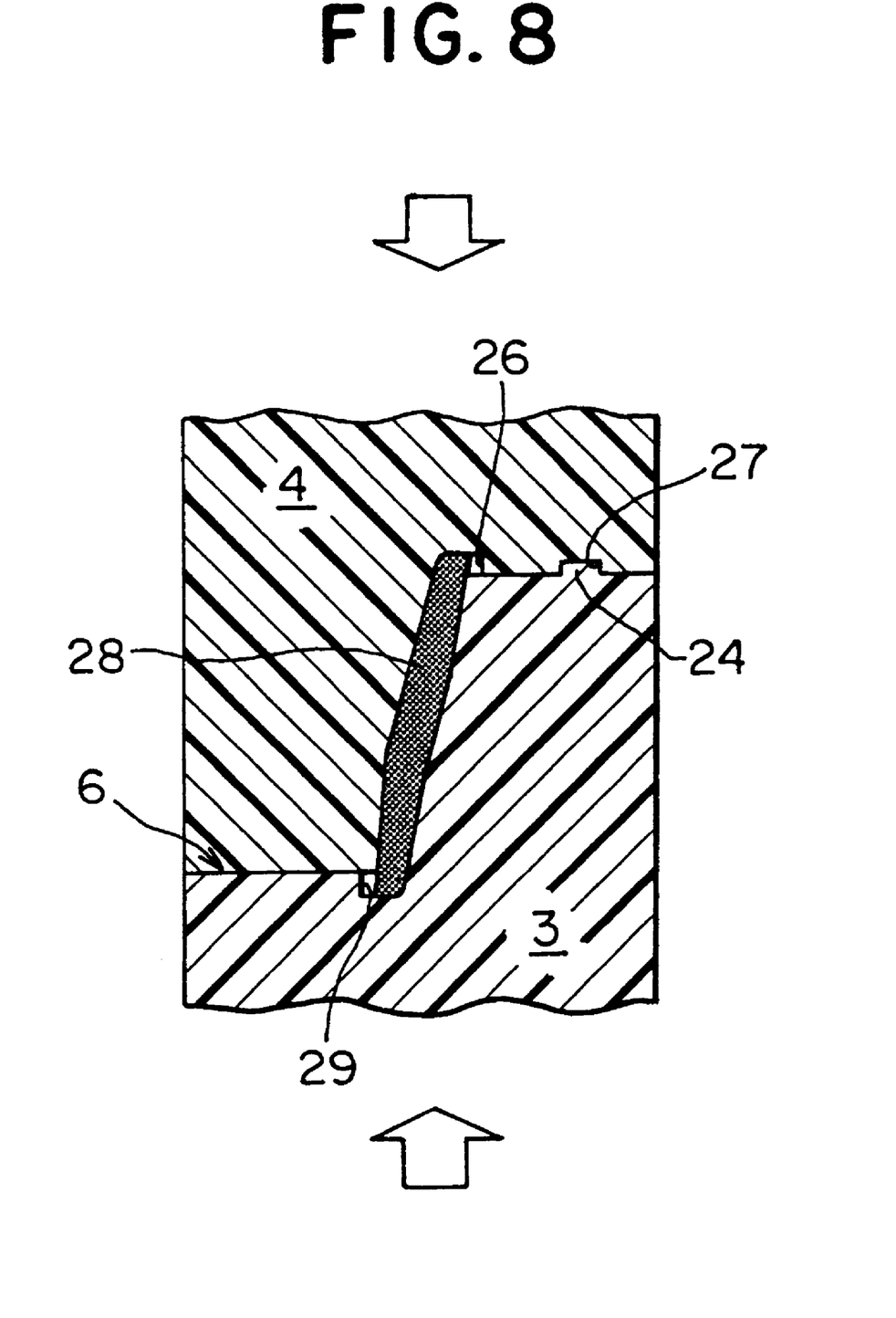
FIG. 8 is a cross-sectional view of a joined state of two resin members in the third embodiment.

When joining is conducted as described above, the side surfaces 18*a*,19*a* are subjected to heat treatment at a high temperature for a short time, and the side surfaces 18*a*,19*a* are fused only at their surfaces so that central parts can retain their base configurations. When the inner member 3 and the first outer member 4 are brought into contact under pressure immediately after the heating and fusion, the fused side surfaces 18*a*,19*a* engage each other so that they are mutually fusion-bonded over fused depths Y5,Y6. Designated at numeral 28 in FIG. 8 is a fusion-bonded portion. Extra fused resin may be formed depending on the extent of the mutually-fused depths Y5,Y6. Such extra fused resin flows into the recesses 29,26 and is confined there.

Overflow of such extra fused resin onto the bottom and top end surfaces 22B,25A and the bottom and top end surfaces (second and first reference surfaces) 22A,25B is therefore minimized, so that a joint 6 can be maintained under good conditions. Since the joining surfaces 3B,4B are formed on the stepped potions, movement of both members in a shear direction indicated by an arrow B is limited by the engagement between the side surface 18*a* and the side surface 19*a*, the joint 6 exhibits higher strength in the shear direction.

In addition, heat is not transmitted so much from the infrared heaters 20,21 to the bottom and top end surfaces 22B,25A and the bottom and top end surfaces 22A,25B owing to the action of the heat barriers 22,23 that these end surfaces remain unfused. Upon joining the inner member 3 and the first outer member 4 together, these end surfaces can therefore serve as reference surfaces, whereby the joining positions of the members 3,4 as viewed in the direction of the arrow A are stabilized. Namely, the joining between the inner member 3 and the first outer member 4 is effected between the fused side surfaces 18*a* and 19*a* and the positional accuracy of the joining during the joining work is assured by the contact between the end surfaces 22B,25A and the corresponding end surfaces 22A,25B.

The joint 6 is also formed through fusion in the third embodiment without frictionally fusing the joining surfaces 3B,4B under vibrations. Neither a bonding piece, which contains metal powder, nor heating wires as heating means in contact with the joining surfaces 3B,4B as in the conventional joining methods are required. Therefore, the process of this embodiment can minimize the limitation to the configurations of the surfaces to be joined and can also avoid the inclusion of a substance other than the resin material of the inner member 3 and the first outer member 4 in the joint 6. The avoidance of the inclusion of an addition substance in the joint 6 can obviate removal work of metal powder, which is contained in a bonding piece, or heating wires upon shredding or re-melting the intake manifold 1 for recycling subsequent to its recovery, leading to better recyclability.

In the above embodiments, both side surfaces are subjected to heat treatment and fused, however, it may be modified to fuse only one of the both side surfaces.

What is claimed is:

1. A process for joining mutually-opposing first resin member and a second resin member, which comprises the following steps:

providing said first resin member with a first reference surface, a first opposing surface located apart from said first reference surface in a direction away from said second resin member, and a first side surface connecting said first reference surface and said first opposing surface such that said first opposing surface, said first reference surface and said first side surface from a substantially step shape;

providing said second resin member with a second reference surface, a second opposing surface located apart from said second reference surface in a direction toward said first resin member, and a second side surface connecting said second reference surface and said second opposing surface such that said second opposing surface, said second reference surface and said second side surface form a substantially step shape, wherein in a joined state of said first resin member and said second resin member, said second reference surface is in contact with said first reference surface and said second side surface is welded with said first side surface;

heating at least one of said first side surface and said second side surface so that said at least one side surface has a portion in a melted condition;

bringing said first reference surface and said second reference surface into contact with each other while said at least one side surface portion is in a melted condition;

joining together, under pressure, said first side surface and said second side surface; and wherein said first and second opposing surfaces comprise a joining part which includes a projection on one of said first and first and second opposing surfaces and a matching recess on the other surface.

2. The process of claim 1, wherein said first reference surface and said first side surface extend substantially at a right angle relative to each other.

3. The process of claim 1, wherein said second reference surface and said second side surface extend substantially at a right angle relative to each other.

4. The process of claim 1, wherein said first side surface includes a first oblique surface, and said first oblique surface extends obliquely with respect to a direction which is perpendicular to said first reference surface.

5. The process of claim 1, wherein said second side surface includes a second oblique surface, and said second oblique surface extends obliquely with respect to a direction which is perpendicular to said second reference surface.

6. The process of claim 1, wherein one of said first resin member and said second resin member has a concave portion and the other one has a convex portion fittedly engageable with said concave portion.

7. The process of claim 6, wherein said concave portion is formed in said first reference surface and is provided with an inner side surface as said first side surface, and said convex portion extends out from said second reference surface and is provided with an outer side surface as said second side surface.

8. The process of claim 7, wherein a width of said convex portion is substantially constant over an entire length of said convex portion, a width in a vicinity of an opening of said concave portion is substantially equal to said width of said convex portion, and a width in a vicinity of an inner end surface of said concave portion is smaller than said width of said convex portion.

9. The process of claim 7, wherein said outer side surface of said convex portion is in a form of oblique surface so that a width of said convex portion becomes smaller toward an outer end surface thereof.

10. The process of claim 7, wherein said inner side surface of said concave portion is in the form of oblique surface so that a width of said concave portion becomes smaller toward an inner end surface thereof.

11. The process of claim 7, wherein a longitudinal dimension of said concave portion is greater than a longitudinal dimension of said convex portion.

12. The process of claim 1, further comprising, as an additional step, providing said first reference surface and said second reference surface with means for maintaining said reference surfaces in an unmelted condition during said heating step.

13. The process of claim 12, wherein said additional step comprises covering said reference surfaces with a heat barrier.

14. The process of claim 1, wherein said heating step comprises the following sub-steps:

arranging an infrared heater in a vicinity of said at least one side surface, and then heating said at least one side surface so that said at least one side surface portion is molten; and causing said infrared heater to move away from said at least one side surface.

15. The process of claim 1, wherein the projection is placed within the recess.

16. The process of claim 15, further providing in said first and second members a recess for containing melted resin.

17. The process of claim 1, wherein the joining together under pressure, said first side surface and said second surface represents the sole and only meltable bond of the mutually-opposing first and second resin members.

* * * * *